US009587123B2

United States Patent
Goi et al.

(10) Patent No.: US 9,587,123 B2
(45) Date of Patent: Mar. 7, 2017

(54) ACTIVE LIGHT BEAM-CURABLE INKJET MAGENTA INK AND INKJET RECORDING METHOD

(71) Applicant: Konica Minolta, Inc., Tokyo (JP)

(72) Inventors: Katsunori Goi, Sagamihara (JP); Ryo Aoyama, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/115,048

(22) PCT Filed: Feb. 26, 2015

(86) PCT No.: PCT/JP2015/055658
§ 371 (c)(1),
(2) Date: Jul. 28, 2016

(87) PCT Pub. No.: WO2015/129815
PCT Pub. Date: Sep. 3, 2015

(65) Prior Publication Data
US 2016/0347959 A1     Dec. 1, 2016

(30) Foreign Application Priority Data

Feb. 27, 2014    (JP) ................. 2014-036614

(51) Int. Cl.
  *C09D 11/101*  (2014.01)
  *C09D 11/322*  (2014.01)
  *B41J 2/01*    (2006.01)
(52) U.S. Cl.
  CPC ............. *C09D 11/101* (2013.01); *B41J 2/01* (2013.01); *C09D 11/322* (2013.01)

(58) Field of Classification Search
  CPC .......... C09D 11/101; C09D 11/322; B41J 2/01
  See application file for complete search history.

(56) References Cited

U.S. PATENT DOCUMENTS

| 8,197,584 B2 * | 6/2012 | Claes ............... C09D 11/101 106/31.6 |
| 2007/0052790 A1 * | 3/2007 | Aoai ............... C09D 11/101 347/224 |

FOREIGN PATENT DOCUMENTS

| JP | S59034737 A | 2/1984 |
| JP | 2001323191 A | 11/2001 |

(Continued)

OTHER PUBLICATIONS

International Search Report dated Jun. 2, 2015 for PCT/JP2015/055658.

*Primary Examiner* — Julian Huffman
*Assistant Examiner* — Michael Konczal
(74) *Attorney, Agent, or Firm* — Lucas & Mercanti, LLP (57) ABSTRACT

An active light beam-curable inkjet magenta ink, wherein the ink comprises at least a pigment, a polymer dispersing agent, a crystalline gelling agent, a photopolymerizable compound and a photopolymerization initiator, the pigment is a solid-solution of PV19 and PR202 which has been subjected to surface treatments with alumina and sulfonic acid, the impart amount of the alumina with respect to the pigment is from 1,500 to 7,500 ppm by mass ratio, and the content of the crystalline gelling agent is from 1.5 to 3.0% by mass with respect to the entirety of the ink has fine storage stability and pinning property, and has a small gloss difference from other colors.

10 Claims, 2 Drawing Sheets

(56) References Cited

FOREIGN PATENT DOCUMENTS

| | | |
|---|---|---|
| JP | 2002121411 A | 4/2002 |
| JP | 2006193745 A | 7/2006 |
| JP | 2007521368 A | 8/2007 |
| JP | 4556414 B2 | 7/2010 |
| JP | 2013121992 A | 6/2013 |
| WO | 2006028267 A1 | 3/2006 |

\* cited by examiner

ACTIVE LIGHT BEAM-CURABLE INKJET MAGENTA INK AND INKJET RECORDING METHOD

CROSS REFERENCE TO RELATED APPLICATION

This Application is a 371 of PCT/JP2015/055658 filed on Feb. 26, 2015 which, in turn, claimed the priority of Japanese Application No. 2014-036614 filed on Feb. 27, 2014, both applications are incorporated herein by reference.

TECHNICAL FIELD

The present invention relates to an active light beam-curable inkjet magenta ink and an inkjet recording method.

BACKGROUND ART

Inkjet recording systems can form images easily and inexpensively, and thus are used in various fields of printing. One of inkjet recording systems is an active light beam-curable inkjet system that forms an image by allowing droplets of a UV-curable ink to land on a recording medium, and curing the droplets by irradiating with active light beam. The active light beam-curable inkjet system has been gaining attention in recent years since it can form an image having high tight adhesiveness even in a recording medium having no ink absorbability.

In an active light beam-curable inkjet ink, a technology of incorporating a gelling agent in an active light beam-curable inkjet ink for the purpose of preventing coalescence of adjacent dots and further enhancing the scratch resistance of an obtained image, is known. In this technology, the extension of the dots can be prevented by the gelation of the ink due to the crystallization of the gelling agent during the landing. Furthermore, since the viscosity of the ink can be increased even at a low temperature, a printed product that is also excellent in scratch resistance at room temperature can be obtained. For example, in Patent Literature 1, the coalescence of dots is prevented by adding an oil gelling agent to an inkjet ink containing a pigment and a photopolymerizable compound to thereby complete the solidification of the ink droplets that have landed on the recording medium within a short time. In Patent Literature 2, an image having fine toughness is efficiently formed by adding a gelling agent that is gelled at a low temperature to a radiation curable ink containing a pigment or a dye.

Meanwhile, in the case when a pigment is used as a color material for an ink, the dispersibility of the pigment can be increased by incorporating a polymer dispersing agent in the ink, whereby the ink can be stably stored. For example, in Patent Literature 3, a pigment is stabilized by dispersion by adding a polymer dispersing agent in a larger amount than that of the pigment by a weight ratio. Furthermore, in Patent Literature 4, the dispersion stability is further increased by adding a polymer dispersing agent to the ink in a larger amount than that of a pigment by weight ratio, and by further adding a dispersion synergist. At this time, by subjecting the pigment particles to a surface treatment to thereby impart an acidic adsorption functional group such as sulfonic acid, the basic functional group of the polymer dispersing agent and the pigment are made easy to associate, whereby the storage stability of the ink can be enhanced.

As magenta pigments for inkjet inks, quinacridones are known, and among these, when a solid-solution of Pigment Violet 19 (PV19) and Pigment Red 202 (PR202) (hereinafter referred to as PV19/PR202) is used, the color region of the formed image can further be enlarged. Meanwhile, in order to increase the storage stability of an ink containing PV19/PR202, it is important not only to improve the affinity of the polymer dispersing agent to the pigment in the ink, but also to improve the affinity of a photopolymerizable compound to the pigment. On the other hand, by subjecting the pigment particles to a surface treatment to thereby impart alumina to the quinacridone backbone, the affinity of the pigment to the photopolymerizable compound can be enhanced, and thus the storage stability of the ink can be enhanced. The alumina can be imparted to the surfaces of the pigment particles by, for example, the method described in Patent Literature 5 or 6.

CITATION LIST

Patent Literature

Patent Literature 1: JP 4556414 B2
Patent Literature 2: JP 2006-193745 A
Patent Literature 3: JP 2007-521368 A
Patent Literature 4: U.S. Pat. No. 8,197,584
Patent Literature 5: JP 59-34737 B2
Patent Literature 6: JP 2002-121411 A

SUMMARY OF INVENTION

Technical Problem

In the case when an ink containing a gelling agent contains a pigment as a color material, the degree of the crystallization of the gelling agent sometimes changes depending on the surface treatment state of the pigment. For example, when a pigment to which alumina has been imparted on the surface is used in an inkjet ink containing a gelling agent, the crystallization of the gelling agent can be inhibited by the association of the alumina and the gelling agent. If the gelling agent is not crystallized, excess leveling occurs, and gloss on the surface of an image easily occurs. Furthermore, if the gelling agent that has not been crystallized precipitates on the surface of the cured ink, gloss occurs on the image surface, and thus the contrast ratio with other color is deteriorated. Such problem of gloss difference easily occurs specifically in a magenta ink such as PV19/PR202.

On the other hand, although it is possible to decrease the gloss difference of the image by decreasing the amount of the gelling agent, the pinning property is also decreased since the gelling agent is small, and thus coalescence of dots occurs due to the enlarging of the droplet diameter during landing.

Accordingly, the present invention aims at providing an active light beam-curable inkjet magenta ink using a solid-solution pigment of PV19/PR202 that has undergone a surface treatment and containing a gelling agent, which has fine storage stability and pinning property. The further object of the present invention is to provide an active light beam-curable inkjet magenta ink having a small gloss difference from other colors.

Solution to Problem

The present invention relates to an active light beam-curable inkjet magenta ink shown below.
1. An active light beam-curable inkjet magenta ink, wherein the ink includes a pigment, a polymer dispersing agent, a crystalline gelling agent, a photopolymerizable compound and a photopolymerization initiator, the pigment is a solid-solution of PV19 and PR202 which has been subjected to surface treatments with alumina and sulfonic acid, the impart amount of the alumina with respect to the pigment is from 1,500 to 7,500 ppm by mass ratio, and the content of the crystalline gelling agent is from 1.5 to 3.0% by mass with respect to the entirety of the ink.

2. The ink according to the above Item. 1, wherein the pigment contains the PV19 in a larger amount than that of the PR202 by mass ratio.

3. The ink according to the above Item. 1 or 2, wherein the impart amount of the alumina with respect to the pigment is from 5,000 to 7,500 ppm by mass ratio.

4. The ink according to the above Item. 1 or 2, wherein the impart amount of the alumina with respect to the pigment is from 2,500 to 3,000 ppm by mass ratio.

Furthermore, the present invention relates to an inkjet recording method shown below.

5. An inkjet recording method, including: injecting an ink contained in an ink set including the light beam-curable inkjet magenta ink according to any one of the above Items. 1 to 4 from an inkjet recording head onto a recording medium; and irradiating the ink that has landed on the recording medium with active light beam.

Advantageous Effects of Invention

The present invention provides an active light beam-curable inkjet magenta ink using a solid-solution pigment of PV19/PR202 that has undergone a surface treatment and containing a gelling agent, which has fine storage stability and pinning property, and has a small gloss difference from other colors.

DESCRIPTION OF EMBODIMENTS

[Active Light Beam-Curable Inkjet Magenta Ink]

The ink according to the present invention is an active light beam-curable inkjet magenta ink, wherein the ink contains a pigment, a polymer dispersing agent, a crystalline gelling agent, a photopolymerizable compound and a photopolymerization initiator, the pigment is a solid-solution of PV19 and PR202 which has been subjected to surface treatments with alumina and sulfonic acid, the impart amount of the alumina with respect to the pigment is from 1,500 to 7,500 ppm by mass ratio, and the content of the crystalline gelling agent is from 1.5 to 3.0% by mass.

The active light beam-curable inkjet magenta ink according to the present invention will be explained below through the detailed explanations on the respective components.

[Pigment]

In the present invention, a solid-solution of PV19 and PR202 which has been subjected to surface treatments with alumina and sulfonic acid is used as a pigment. By using the solid-solution of these, the color region can be enlarged, and thus it becomes possible to express a magenta color that is closer to a standard sample such as Japan color 2011 or the like.

The surface treatment can be conducted by a known method. For example, a surface treatment with alumina can be conducted by the method described in Patent Literature 5 or 6, or by a method including suspending alumina in a dispersion liquid in which a pigment is dispersed, and then adjusting a pH. The amount of the alumina to be imparted can be adjusted to a desired amount by changing the amount of the alumina that is added in each method. Furthermore, a surface treatment with sulfonic acid can be conducted by a method including adding a sulfonating agent to a slurry-like pigment dispersant, and reacting the sulfonating agent and the dispersant under a high temperature. The impart amount of the sulfonic acid can be adjusted to a desired amount by adjusting the amount of the sulfonating agent to be added. The amount of the imparted alumina or sulfonic acid can be confirmed by measuring the pigment by means of an inductively coupled plasma-atomic emission spectrometer (ICP-AES) or the like, and quantifying the amount of the alumina (or Al element) or sulfonic acid (or S element). In addition, during the storage of an ink containing a pigment, alumina or sulfonic acid is sometimes detached from the pigment during the storage. Therefore, it is also possible to quantify the alumina (or Al element) or sulfonic acid (or S element) in the ink and use the amount as the alumina impart amount or sulfonic acid impart amount in the present invention.

It is preferable that the alumina is imparted by from 1,500 to 7,500 ppm by mass ratio to the pigment. By setting the impart amount of the alumina to 1,500 ppm or more, the affinity to the photopolymerizable compound and the polymer dispersing agent increases, and thus the pigment can be stored stably. Furthermore, by setting the impart amount of the alumina to 7,500 ppm or less, the insufficient crystallization of the gelling agent due to the association of the alumina and the gelling agent can be suppressed, and thus generation of gloss due to excess leveling can be suppressed.

In addition, the impart amount of the alumina can be changed depending on the property required for the active light beam-type inkjet magenta ink. For example, when the impart amount of the alumina is set to from 5,000 to 7,500 ppm, the affinity to the photopolymerizable compound is enhanced, and thus the storage stability of the magenta ink can further be enhanced. Alternatively, when the impart amount of the alumina is set to from 2,500 to 3,000 ppm, the gelling agent is suitably crystallized, and thus the gloss difference from other colors can further be decreased.

Although the amount of the sulfonic acid is not specifically limited, it is preferable that the sulfonic acid is imparted by 1,000 to 1,500 ppm by mass ratio with respect to the pigment.

It is preferable that the solid-solution contains PV19 in a larger amount than that of PR202 by mass ratio. By such ratio, it is possible to extend the available color region to the direction of darker colors.

As the solid-solution of these, a commercially available product can also be used. Commercially available examples of such solid-solution include CINQUASIA Magenta L4540, D4500J, CINQUASIA Red L4330, RT-355D, which are manufactured by BASF, 228-2120 manufactured by Sun Chemical, Inkjet Magenta E7B manufactured by Clariant, and the like.

The pigment can be dispersed by, for example, a ball mill, a sand mill, an attritor, a roll mill, an agitator, a Henschel mixer, a colloid mill, an ultrasonic homogenizer, a pearl mill, a wet jet mill and a paint shaker and the like. It is preferable that the pigment is dispersed so that the pigment particles have an average particle diameter of preferably from 0.08 to 0.5 μm, and a maximum particle diameter of preferably from 0.3 to 10 μm, more preferably from 0.3 to 3 μm. The dispersion of the pigment is adjusted by the selection of the pigment, the polymer dispersing agent and the dispersion medium, the conditions for dispersion, and the conditions for filtration, and the like.

The average particle diameter of the pigment particles in the present invention means a value obtained by dynamic light scattering by using Zetasizer Nano ZSP manufactured by Malvern. In the dynamic light scattering, the diffusion of particles that are moved by the Brownian motion (dynamic light scattering) is measured, and the result thereof (a diffusion coefficient D) can be plugged into the Stokes-Einstein equation ($D=kT/6\pi \mu a$) to convert to a particle diameter and particle size distribution (in the above-mentioned Stokes-Einstein equation, k represents the Boltzmann constant, T represents the temperature (K), μ represents the viscosity of the dilution liquid, and a represents the particle size). Incidentally, since an ink containing a color material has a high concentration and thus light does not transmit by this measurement device, the ink is diluted by 200-fold and then measured. The measurement temperature is an ordinary temperature (25° C.)

The content of the pigment is preferably from 0.1 to 20% by mass, more preferably from 0.4 to 10% by mass with respect to the active light beam-curable inkjet magenta ink. This is because if the content of the pigment is too small, the color development of the obtained image is not sufficient, whereas when the content is too much, the viscosity of the ink is high, and thus the injection property is lowered.

[Polymer Dispersing Agent]

The active light beam-curable inkjet magenta ink contains a polymer dispersing agent. By incorporating the polymer dispersing agent, the dispersibility of the pigment can be enhanced.

The kind of the polymer dispersing agent is not specifically limited. Preferable examples of the polymer dispersing agent include BYK-2164, BYK-168 and BYK N-22024 manufactured by BYC Chemie, BYK JET-9150, BYK JET-9151 and EFKA 7701 manufactured by Altana, EFKA 4310, EFKA 4320 and EFKA 4401 manufactured by BASF, SOLSPERSE 24000GR and SOLSPERSE 39000 by Avecia, Ajisper PB821 and PB824 manufactured by Ajinomoto Fine-Techno Co., Inc., and the like.

The content of the polymer dispersing agent is preferably from 20% by mass to 70% by mass, more preferably from 30 to 60% by mass, further preferably from 35 to 50% by mass with respect to the pigment. This is because if the content of the polymer dispersing agent with respect to the pigment is too much, the polymer dispersing agent associates with the gelling agent and thus gelation is inhibited, and thus pinning becomes less effective during the landing of the droplets of the ink, and the droplets extend and overlap with each other and cause so-called liquid gathering, whereby the image quality is lowered. On the other hand, when the content of the polymer dispersing agent with respect to the pigment is small, the surface of the pigment cannot be sufficiently covered by the polymer dispersing agent, and thus the stability is lowered.

It is preferable that the polymer dispersing agent has a comb-type block structure. By specifically using a polymer dispersing agent having a block copolymer (comb-type) backbone among polymer dispersing agents, the side chains are extended and a steric hindrance effect that suppresses flocculation in the pigment is easily obtained, and thus the dispersibility of the pigment is improved.

Besides the above-mentioned polymer dispersing agents, for example, a hydroxyl group-containing carboxylic acid ester, a salt of a long chain polyaminoamide with a high molecular weight acid ester, a salt of a high molecular weight polycarboxylic acid, a salt of a long chain polyaminoamide and a polar acid ester, a high molecular weight unsaturated acid ester, a polymer copolymerized product, a modified polyurethane, a modified polyacrylate, a polyether ester-type anion-based activating agent, a naphthalenesulfonic acid-formalin condensate salt, an aromatic sulfonic acid-formalin condensate salt, a polyoxyethylene-alkyl phosphate ester, a polyoxyethylene nonyl phenyl ether and a stearylamine acetate and the like may also be added. Examples of commercially available products of the dispersing agent include Solsperse series by Avecia, PB series by Ajinomoto Fine-Techno Co., Inc. and the like.

The active light beam-curable inkjet magenta ink may further contain a disperse aid as necessary. The disperse aid may be selected depending on the pigment. The total amount of the polymer dispersing agent and the disperse aid is preferably from 1 to 50% by mass with respect to the pigment.

The active light beam-curable inkjet magenta ink may further contain a dispersion medium for dispersing a pigment as necessary. Although a solvent may be contained in the ink as the dispersion medium, in order to suppress the remaining of the solvent in a formed image, it is preferable that the photopolymerizable compound mentioned below (specifically a monomer having a low viscosity) is a dispersion medium.

[Crystalline Gelling Agent]

The active light beam-curable inkjet magenta ink contains a crystalline gelling agent (also referred to as a gelling agent).

A gelling agent is generally defined as an organic substance that is a solid at an ordinary temperature and turns into a liquid upon being heated. The melting point of the gelling agent is preferably a melting point of 30° C. or more and lower than 150° C. It is preferable that the gelling agent contained in the active light beam-curable inkjet magenta ink at least 1) dissolves in a photopolymerizable compound at a temperature higher than a sol-gel phase transition temperature, and 2) crystallizes in an ink at a temperature equal to or less than the sol-gel phase transition temperature.

In 1), "a sol-gel phase transition temperature" refers to a temperature at a change (transition) point where a sol state is changed (transit) to a gel state, and has the same meaning as those of terms referred to as a gelation temperature, a gel transition temperature, a gel solution temperature, a gel softening temperature, a sol-gel phase transition temperature, a sol gel transition point and a gelation point.

In 2), when the gelling agent is crystallized in the ink, it is preferable that a plate crystal, which is a crystallized product of the gelling agent, forms a space that is surrounded in a three-dimensional manner, and the photopolymerizable compound is enclosed in the space. Such structure in which a photopolymerizable compound is enclosed in a space surrounded by a plate crystal in a three-dimensional manner is sometimes referred to as "a card house structure". When a card house structure is formed, a liquid photopolymerizable compound can be retained, and thus ink droplets can be subjected to pinning. By this way, the coalescence of the droplets can be suppressed. In order to form the card house structure, it is preferable that the photopolymerizable compound and the gelling agent dissolved in the ink are compatible. In response to this, if the photopolymerizable compound and the gelling agent dissolved in the ink are in phase separation, the card house structure is difficult to form in some cases.

Although the cause of the phase separation of the photopolymerizable compound and the gelling agent dissolved in the ink is unclear, it is considered that the card house structure in the ink is partially degraded by an interaction between the pigment and the gelling agent in the ink. It is assumed that a part where the ink component including the liquid photopolymerizable compound is retained by a card house structure and a part where the ink component is not retained are present in the ink by doing so, and thus phase separation occurs. Although the reason for this phenomenon is unclear, it was clarified by the consideration of the present inventors that this phenomenon occurs more significantly in a magenta ink containing quinacridone as a major component as compared to other pigments. In response to this, by treating the pigment with alumina, the surface of the pigment is electrically charged. The interaction with the electrically-charged pigment acts more strongly with the photopolymerizable compound than with the gelling agent in the ink. Therefore, it is assumed that the gelling agent becomes difficult to receive the limitation on gelation by the other ink components and thus can normally create a card house structure, and thus the pinning property is improved. Furthermore, it is assumed that, since the bonding with the dispersing agent is conducted more definitely by treating the pigment with sulfonic acid, the dispersion stability of the ink is improved. By providing such constitution, the gloss stability is improved without decreasing the content of the gelling agent, and the glossiness difference from other inks can also be easily adjusted.

The kind of the gelling agent is not specifically limited. Preferable examples of the gelling agent include:

ketone waxes such as dilignocerylketone, dibehenylketone, distearylketone, dieicosylketone, dipalmitylketone, dilaurylketone, dimyristylketone, myristylpalmitylketone and palmitylstearylketone (for example, 18-Pentatriacontanon (manufactured by Alfa Aeser), Hentriacontan-16-on (manufactured by Alfa Aeser), Kao Wax T1 (manufactured by Kao Corporation) and the like);

ester waxes such as behenyl behenylate, icosyl icosanate, stearyl stearate, palmityl stearate, cetyl palmitate, myristyl myristinate, cetyl myristinate and myrisyl serotinate (for example, Unistar M-2222SL (manufactured by NOF Corporation), Exepearl SS (manufactured by Kao Corporation, melting point: 60° C.), EMALEX CC-18 (manufactured by Nihon Emulsion Co., Ltd.), Amreps PC (manufactured by Kokyu Alcohol Kogyo Co., Ltd.), Exepearl MY-M (manufactured by Kao Corporation), Spermaceti (manufactured by NOF Corporation) and EMALEX CC-10 (manufactured by Nihon Emulsion Co., Ltd.), and the like);

petroleum-based waxes such as paraffin wax, microcrystalline wax and petrolatum;

plant-based waxes such as candelilla wax, carnauba wax, rice wax, wood wax, jojoba oil, jojoba solid wax and jojoba ester;

animal-based waxes such as beeswax, lanolin and spermaceti;

mineral-based waxes such as Montan wax and hydrogenated wax;

hardened castor oil or hardened castor oil derivatives;

modified waxes such as Montan wax derivatives, paraffin wax derivatives, microcrystalline wax derivatives or polyethylene wax derivatives;

higher alcohols such as stearyl alcohol and behenyl alcohol;

hydroxystearic acids such as 12-hydroxystearic acid; 12-hydroxystearic acid derivatives;

aliphatic acid amides such as lauric acid amide, stearic acid amide, behenic acid amide, oleic acid amide, erucic acid amide, licinol acid amide and 12-hydroxystearic acid amide (for example, Nikka Amide series manufactured by Nippon Kasei Chemical Co., Ltd., ITOWAX series manufactured by Ito Oil Chemicals Co., Ltd., FATTYAMID series manufactured by Kao Corporation, and the like);

N-substituted aliphatic acid amides such as N-stearyl stearic acid amide and N-oleylpalmitic acid amide;

special aliphatic acid amides such as N,N'-ethylenebis stearyl amide, N,N'-ethylenebis-12-hydroxystearylamide and N,N'-xylylenebisstearylamide;

higher amines such as dodecylamine, tetradecylamine or octadecylamine;

aliphatic acid ester compounds such as stearylstearic acid, oleylpalmitic acid, glycerin aliphatic acid esters, sorbitan aliphatic acid esters, propylene glycol aliphatic acid esters, ethylene glycol aliphatic acid esters and polyoxyethylene aliphatic acid esters (for example, EMALLEX series manufactured by Nihon Emulsion Co., Ltd., Rikemal series manufactured by Riken Vitamin Co., Ltd., Poem series manufactured by Riken Vitamin Co., Ltd., and the like);

sucrose aliphatic acid esters such as sucrose stearate and sucrose palmitate (for example, Ryoto Sugar Ester series manufactured by Mitsubishi-Kagaku Foods Corporation);

synthetic waxes such as polyethylene wax and α-olefin anhydrous maleic acid copolymer waxes (UNILIN series manufactured by Baker-Petrolite, and the like);

dimer acids;

dimer diols (PRIPOR series manufactured by CRODA, and the like), and the like.

One kind, or two or more kinds of these gelling agents may be incorporated in the active light beam-curable inkjet magenta ink.

As the gelling agent, ketone waxes, ester waxes, higher aliphatic acids, higher alcohols and aliphatic acid amides are specifically preferable, and ketone waxes or ester waxes are further preferable.

Specifically preferable gelling agents include those represented by the following general formulas (G1) and (G2).

General Formula (G1): R1—CO—R2

General Formula (G2): R3—COO—R4

In the formulas, R1 to R4 each independently represent an alkyl chain having a straight chain moiety having 12 or more carbon atoms and optionally having branches.

The general formula (G1) is referred to as a ketone wax, and the general formula (G2) is referred to as an aliphatic acid ester. These gelling agents are preferable since they can form the ink droplets into a gel more stably (with fine reproducibility) and can suppress the coalescence of ink droplets (dots) that have landed on a recording medium.

The sol-gel phase transition temperature of the inkjet magenta ink is optionally preset, but is preferably in the range of from 30 to 100° C. in view of the stable injection property of the ink droplets, harmful effects associated with high temperature heating, and the like. Furthermore, the sol-gel phase transition temperature is preferably between the ink temperature in an inkjet recording head and the temperature of the recording medium.

In the method for measuring the sol-gel phase transition temperature, for example, a gel-like test piece is put on a heat plate, the heat plate is gradually heated, and the temperature at which the shape of the test piece is degraded is measured, and this can be obtained as the sol-gel phase transition temperature. Furthermore, the temperature can also be measured by using a commercially available viscoelasticity measurement apparatus (for example, a viscoelasticity measurement apparatus MCR300 manufactured by Physica).

The sol-gel phase transition temperature can be adjusted by the kind, addition amount and the like of the photopolymerizable compound mentioned below.

Since the active light beam-curable inkjet magenta ink contains the gelling agent at a predetermined amount, when the ink is ejected from the inkjet recording head and lands on the recording medium as ink droplets, and the temperature decreases to a temperature lower than the sol-gel phase transition temperature, the ink is quickly put into a gel state. Therefore, the mixing of the dots and the coalescence of the dots are suppressed, and thus a high-quality image can be formed at high-speed printing. Thereafter, the gelled ink droplets are cured upon irradiation with light and thus are fixed on the recording medium to form a strong image film.

In the active light beam-curable inkjet magenta ink, since the ink droplets that have landed on the recording medium are quickly gelled, the ink droplets are not diffused on the recording medium, and thus the oxygen in the environment is difficult to enter into the ink droplets. Therefore, the curing is difficult to undergo the inhibition effect by the oxygen.

The content of the gelling agent in the active light beam-curable inkjet magenta ink is from 1.5 to 3.0% by mass, more preferably from 2.0 to 2.5% by mass with respect to the entirety of the ink. In the case when two or more kinds of gelling agents are contained, it is preferable that the total amount of these is within the above-mentioned range. When the content of the gelling agent is lower than 1.5% by mass, the pinning property of the ink is lowered, and thus it is possible that the active light beam-curable inkjet magenta ink is not sufficiently put into sol-gel phase transition, and the dots of the ink are extended. On the other hand, when the content of the gelling agent is more than 3.0% by mass, excess gloss occurs in the ink by the gelling agent that has precipitated on the surface of the image, and the ink injection property from the inkjet head may be lowered.

The active light beam-curable inkjet magenta ink may further contain an aliphatic acid that is different from the above-mentioned gelling agent. This is because the dispersion stability of the ink is improved, and thus the storage stability and ejection stability are improved. Furthermore, this is because the surface slippage of the ink when the ink is ejected onto the recording medium becomes fine.

The aliphatic acid is preferably a compound having 12 or more carbon atoms.

Specific examples of the aliphatic acid include behenic acid ($C_{22}H_{44}O_2$), arachidic acid ($C_{20}H_{40}O_2$), stearic acid ($C_{18}H_{36}O_2$), palmitic acid ($C_{16}H_{32}O_2$), myristic acid ($C_{14}H_{28}O_2$), lauric acid ($C_{12}H_{24}O_2$), oleic acid ($C_{18}H_{34}O_2$) and erucic acid ($C_{22}H_{42}O_2$), such as Lunac BA, Lunac S-90V, Lunac S-98, Lunac P-70, Lunac P-95, Lunac MY-98, Lunac L-70 and Lunac L-98 (all are manufactured by Kao Corporation), NAA-2225 beads, NAA-222 powder, beads stearic acid Sakura, beads stearic acid Tsubaki, powder stearic acid Sakura, powder stearic acid Tsubaki, NAA-160, NAA-142, NAA-122, NAA-34, NAA-35 and erucic acid (all are manufactured by NOF Corporation), and the like.

The content of the aliphatic acid is preferably from 0.01 ppm by mass to 10 ppm by mass, more preferably from 0.01 ppm by mass to 0.18 ppm by mass with respect to the total mass of the ink. This is because, when the content is lower than 0.01 ppm by mass, the dispersion stability of the ink is poor, and fine storage stability and ejection stability cannot be obtained. Furthermore, this is because the surface smoothness of the ink when the ink is ejected onto the recording medium is deteriorated, and thus so-called paper jam easily occurs. On the other hand, when the content is more than 10 ppm by mass, the dispersion stability of the ink is lowered.

[Photopolymerizable Compound]

The active light beam-curable inkjet magenta ink contains a photopolymerizable compound.

The photopolymerizable compound is a compound that is crosslinked or polymerized by active light beam. Examples of the active light beam are electron beam, ultraviolet ray, α-ray, γ-ray, X-ray, and the like, and ultraviolet ray and electron beam are preferable. The photopolymerizable compound is a radical-polymerizable compound or a cation-polymerizable compound, and preferably a radical-polymerizable compound.

The radical-polymerizable compound is a compound having a radical-polymerizable, ethylenically unsaturated bond (monomers, oligomers, polymers, or mixtures thereof). Only one kind, or two or more kinds of radical-polymerizable compound(s) may be contained in the active light beam-curable inkjet magenta ink.

Examples of the compound having a radical-polymerizable, ethylenically unsaturated bond include unsaturated carboxylic acids and salt thereof, unsaturated carboxylic acid ester compounds, unsaturated carboxylic acid urethane compounds, unsaturated carboxylic acid amide compounds and anhydrides thereof, acrylonitrile, styrene, unsaturated polyesters, unsaturated polyethers, unsaturated polyamides, unsaturated urethanes and the like. Examples of the unsaturated carboxylic acid include (meth)acrylic acid, itaconic acid, crotonic acid, isocrotonic acid, maleic acid and the like.

Among these, the radical-polymerizable compound is preferably an unsaturated carboxylic acid ester compound, more preferably a (meth)acrylate compound. The (meth)acrylate compound may be not only the monomer mentioned below, but also an oligomer, a mixture of a monomer and an oligomer, a modified product, an oligomer having a polymerizable functional group or the like.

Incidentally, in this specification, "(meth)acrylate" encompasses acrylate monomers and/or acrylate oligomers, methacrylate monomers and/or methacrylate oligomers.

Examples of the (meth)acrylate compound include monofunctional monomers such as isoamyl (meth)acrylate, stearyl (meth)acrylate, lauryl (meth)acrylate, octyl (meth) acrylate, decyl (meth)acrylate, isomyristyl (meth) acrylate, isostearyl (meth) acrylate, 2-ethylhexyl-diglycol (meth) acrylate, 2-hydroxybutyl (meth) acrylate, 2-(meth)acryloloxyethylhexahydrophthalic acid, butoxyethyl (meth) acrylate, ethoxydiethylene glycol (meth) acrylate, methoxy-diethylene glycol (meth) acrylate, methoxypolyethylene glycol (meth) acrylate, methoxypropylene glycol (meth) acrylate, phenoxyethyl (meth) acrylate, tetrahydrofurfuryl (meth) acrylate, isobornyl (meth) acrylate, 2-hydroxyethyl (meth) acrylate, 2-hydroxypropyl (meth) acrylate, 2-hydroxy-3-phenoxypropyl (meth) acrylate, 2-(meth) acryloloxyethylsuccinic acid, 2-(meth)acryloloxyethyl-phthalic acid, 2-(meth)acryloloxyethyl-2-hydroxyethyl-phthalic acid and t-butylcyclohexyl (meth) acrylate;

bifunctional monomers such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentylglycol di(meth)acrylate, dimethylol-tricyclodecane di(meth)acrylate, di(meth)acrylate of PO adduct of bisphenol A, hydroxypivalic acid neopentyl glycol di(meth)acrylate, polytetramethylene glycol di(meth)acrylate, polyethylene glycol diacrylate and tripropylene glycol diacrylate;

tri- or more functional multifunctional monomers such as trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxytri(meth)acrylate and pentaerythritol ethoxytetra(meth)acrylate; and the like.

The (meth)acrylate compound is preferably stearyl (meth)acrylate, lauryl (meth)acrylate, isostearyl (meth) acrylate, ethoxydiethylene glycol (meth) acrylate, isobornyl (meth) acrylate, tetraethylene glycol di(meth)acrylate, glycerin propoxytri(meth)acrylate or the like in view of photosensitivity and the like.

The (meth)acrylate compound may be a modified product. Examples of the modified product include ethylene oxide-modified (meth)acrylate compounds such as ethylene oxide-modified trimethylolpropane tri(meth)acrylate and ethylene oxide-modified pentaerythritol tetraacrylate; caprolactone-modified (meth)acrylate compounds such as caprolactone-modified trimethylolpropane tri(meth)acrylate; and caprolactam-modified (meth)acrylate compounds such as caprolactam-modified dipentaerythritol hexa(meth)acrylate, and the like.

The active light beam-curable inkjet magenta ink is preferably such that at least a part of the photopolymerizable compound is an ethylene oxide-modified (meth)acrylate compound. This is because the ethylene oxide-modified (meth)acrylate compound has high photosensitivity, and thus easily forms a card house structure (mentioned below) when the ink is gelled under a low temperature. Furthermore, the ethylene oxide-modified (meth)acrylate compound easily dissolves in other ink components under a high temperature and shrinks little upon curing, and thus is difficult to cause curling of a printed product.

Examples of the ethylene oxide-modified (meth)acrylate compound include 4EO-modified hexanediol diacrylate CD561 (molecular weight: 358), 3EO-modified trimethylolpropane triacrylate SR454 (molecular weight: 429), 6EO-modified trimethylolpropane triacrylate SR499 (molecular weight: 560) and 4EO-modified pentaerythritol tetraacrylate SR494 (molecular weight: 528) manufactured by Sartomer; polyethylene glycol diacrylate NK ester A-400 (molecular weight: 508), polyethylene glycol diacrylate NK ester A-600 (molecular weight: 742), polyethylene glycol dimethacrylate NK ester 9G (molecular weight: 536) and polyethylene glycol dimethacrylate NK ester 14G (molecular weight: 770) manufactured by Shin-Nakamura Chemical Co., Ltd.; tetraethylene glycol diacrylate V#335HP (molecular weight: 302) manufactured by Osaka Organic Chemical Industry Ltd.; 3PO-modified trimethylolpropanetriacrylate Photomer 4072 (molecular weight: 471) manufactured by Cognis; 1,10-decanediol dimethacrylate NK ester DOD-N (molecular weight: 310), tricyclodecanedimethanol diacrylate NK ester A-DCP (molecular weight: 304) and tricyclodecanedimethanol dimethacrylate NK ester DCP (molecular weight: 332) manufactured by Shin-Nakamura Chemical Co., Ltd.; and the like.

The (meth)acrylate compound may also be a polymerizable oligomer. Examples of the polymerizable oligomer include epoxy (meth)acrylate oligomers, aliphatic urethane (meth)acrylate oligomers, aromatic urethane (meth)acrylate oligomers, polyester (meth)acrylate oligomers, and straight chain (meth)acrylc oligomers, and the like.

The cation-polymerizable compound may be an epoxy compound, a vinyl ether compound, and an oxetane compound and the like. Only one kind or, or two or more kinds of the cation-polymerizable compound(s) may be contained in the active light beam-curable inkjet magenta ink.

The epoxy compound is an aromatic epoxide, an alicyclic epoxide or an aliphatic epoxide or the like, and an aromatic epoxide and an alicyclic epoxide are preferable so as to enhance curability.

The aromatic epoxide may be a di- or poly-glycidyl ether obtained by reacting a polyvalent phenol or an alkylene oxide adduct thereof with epichlorohydrin. Examples of the polyvalent phenol or the alkylene oxide adduct thereof to be reacted include bisphenol A or alkylene oxide adducts thereof, and the like. The alkylene oxide in the alkylene oxide adduct may be ethylene oxide and propylene oxide and the like.

The alicyclic epoxide may be a cycloalkane oxide-containing compound obtained by epoxydizing a cycloalkane-containing compound with an oxidizing agent such as hydrogen peroxide or a peracid. The cycloalkane in the cycloalkane oxide-containing compound may be cyclohexene or cyclopentene.

The aliphatic epoxide may be a di- or polyglycidyl ether obtained by reacting an aliphatic polyvalent alcohol or an alkylene oxide adduct thereof with epichlorohydrin. Examples of the aliphatic polyvalent alcohol include alkylene glycols such as ethylene glycol, propylene glycol and 1,6-hexanediol. The alkylene oxide in the alkylene oxide adduct may be ethylene oxide, propylene oxide and the like.

Examples of the vinyl ether compound include monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylenecarbonate, dodecyl vinyl ether, diethylene glycol monovinyl ether and octadecyl vinyl ether;

di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether and trimethylolpropane trivinyl ether; and the like. Among these vinyl ether compounds, di- or tri-vinyl ether compounds are preferable with consideration for curability, tight adhesiveness and the like.

The oxetane compound is a compound having an oxetane ring, and examples thereof include the oxetane compounds described in JP 2001-220526 A, JP 2001-310937 A and JP 2005-255821 A, and the like. Specific examples include the compound represented by the general formula (1) described in paragraph 0089 of JP 2005-255821 A, and the compound represented by the general formula (2) described in paragraph 0092, the compound represented by the general formula (7) described in paragraph 0107, the compound represented by the general formula (8) described in paragraph 0109 and the compound represented by the general formula (9) described in paragraph 0116 of the same publication, and the like. The general formulas (1), (2), (7), (8) and (9) described in JP 2005-255821 A are shown below.

[Chemical Formula 1]

The content of the photopolymerizable compound in the active light beam-curable inkjet magenta ink is preferably from 1 to 97% by mass, more preferably from 30 to 95% by mass.

[Photopolymerization Initiator]

The active light beam-curable inkjet magenta ink further includes a photopolymerization initiator.

The photopolymerization initiator includes an intermolecular bond-cleavage type and an intermolecular hydrogen-withdrawing type. Examples of the photopolymerization initiator of an intermolecular bond-cleavage type include acetophenones such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenylketone, 2-methyl-2-morpholino(4-thiomethylphenyl)propan-1-one and 2-benzyl-2-dimethylamino-1-(4-morpholinophenyl)-butanone; benzoins such as benzoin, benzoin methyl ether and benzoin isopropyl ether; acylphosphine oxides such as 2,4,6-trimethylbenzoindiphenylphosphineoxide; benzyl and methylphenylglyoxy ester, and the like.

Examples of the photopolymerization initiator of an intermolecular hydrogen-withdrawing type include benzophenones such as benzophenone, o-benzoyl methyl benzoate-4-phenylbenzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl)benzophenone and 3,3'-dimethyl-4-methoxybenzophenone; thioxanthones such as 2-isopropylthioxanthone, 2,4-dimethylthioxanthone, 2,4-diethylthioxanthone and 2,4-dichlorothioxanthone; aminobenzophenones such as Michler's ketone and 4,4'-diethylaminobenzophenone; 10-butyl-2-chloroacridone, 2-ethylanthraquinone, 9,10-phenanthrenequinone, camphorquinone; and the like.

The content of the photopolymerization initiator in the active light beam-curable inkjet magenta ink is preferably from 0.01% by mass to 10% by mass depending on the kinds of the active light beam and the photopolymerizable compound, and the like.

The active light beam-curable inkjet magenta ink may also contain a photoacid generator as the photopolymerization initiator. As examples of the photoacid generator, chemical amplification-type photoresists, or compounds utilized in light cation polymerization are used (see "Organic Materials for Imaging" edited by the Japanese Research Association for Organic Electronics Materials, Bunshin-Publishing (1993), pages 187 to 192).

The active light beam-curable inkjet magenta ink may further include a photopolymerization initiator aid, a polymerization inhibitor and the like as necessary. The photopolymerization initiator aid may be a tertiary amine compound, and an aromatic tertiary amine compound is preferable. Examples of the aromatic tertiary amine compound include N,N-dimethylaniline, N,N-diethylaniline, N,N-dimethyl-p-toluidine, ethyl N,N-dimethylamino-p-benzoate ester, isoamylethyl N,N-dimethylamino-p-benzoate ester, N,N-dihydroxyethylaniline, trimethylamine and N,N-dimethylhexylamine, and the like. Among these, ethyl N,N-dimethylamino-p-benzoate ester and isoamylethyl N,N-dimethylamino-p-benzoate ester are preferable. The active light beam-curable inkjet magenta ink may include only one kind, or two or more kinds of these compounds.

Examples of the polymerization inhibitor include (alkyl) phenols, hydroquinone, catechol, resorcine, p-methoxyphenol, t-butylcatechol, t-butylhydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenylhydroxylamine, tri-p-nitrophenylmethyl, N-(3-oxyanilino-1,3-dimethylbutylidene)aniline oxide, dibutylcresol, cyclohexanoneoxime cresol, guaiacol, o-isopropylphenol, butyraldoxime, methyl ethyl ketoxime, cyclohexaneneoxime and the like.

[Other Components]

The active light beam-curable inkjet magenta ink may further contain other components as necessary. The other components may be various additives, other resins and the like. Examples of the additive include surfactants, leveling additives, matting agents, ultraviolet ray absorbers, infrared ray absorbers, antibacterial agents, basic compounds for enhancing storage stability of inks, and the like. Examples of the basic compounds include basic alkali metal compounds, basic alkaline earth metal compounds, basic organic compounds such as amines, and the like. Examples of the other resins include resins for adjusting the physical properties of a cured film, and examples include polyester-based resins, polyurethane-based resins, vinyl-based resins, acrylic-based resins, rubber-based resins and waxes, and the like.

The active light beam-curable inkjet magenta ink can be obtained by mixing the pigment, polymer dispersing agent, gelling agent, photopolymerizable compound and photopolymerization initiator mentioned above with optional respective components under heating. It is preferable to filtrate the obtained mixed liquid with a predetermined filter. At this time, it is also possible to prepare a dispersant containing the pigment and the polymer dispersing agent in advance, adding the residual components to this, and mixing under heating.

[Physical Properties of Active Light Beam-Curable Inkjet Magenta Ink]

As mentioned above, the active light beam-curable inkjet magenta ink is an ink that causes sol-gel phase transition in a reversible manner by temperature. A sol-gel phase transition type active light beam-curable ink is a sol at a high temperature (for example, about 80° C.), and thus can be ejected from an inkjet recording head. When the active light beam-curable inkjet magenta ink is ejected under a high temperature, ink droplets (dots) land on a recording medium, and are then naturally cooled and gelled. By this way, the coalescence of the adjacent dots can be suppressed, and thus an image quality can be enhanced.

In order to enhance the injection property of a sol-gel phase transition type ink, it is preferable that the viscosity of the ink at a high temperature is a predetermined value or less. Specifically, it is preferable that the viscosity at 80° C. of the active light beam-curable inkjet magenta ink is from 3 to 20 mPa·s. On the other hand, in order to suppress the coalescence of the adjacent dots, it is preferable that the viscosity of the ink after landing at an ordinary temperature is a predetermined value or more. Specifically, it is preferable that the viscosity at 25° C. of the active light beam-curable inkjet magenta ink is 1,000 mPa·s or more.

The gelation temperature of the sol-gel phase transition type ink is preferably 40° C. or more and 70° C. or less, more preferably 50° C. or more and 65° C. or less. When the gelation temperature of the ink is more than 70° C. in the case when the injection temperature is in the vicinity of 80° C., gelation easily occurs during the injection, and thus the injection property is lowered. On the other hand, when the gelation temperature is lower than 40° C., the ink is not gelled rapidly after the landing on the recording medium. The gelation temperature refers to a temperature when an ink is gelled and the fluidity is lowered in the process of cooling of the ink in a sol state.

The viscosity of the sol-gel phase transition type ink at 80° C., and the viscosity and gelation temperature at 25° C. can be obtained by measuring the temperature change in the kinetic viscoelasticity of the ink by a rheometer. Specifically, a temperature change curve of the viscosity when the ink is heated to 100° C., and cooled to 20° C. under conditions of a shear velocity of 11.7 (1/s) and a temperature lowering velocity of 0.1° C./s is obtained. Furthermore, the viscosity at 80° C. and the viscosity at 25° C. can be obtained by respectively reading the viscosities at 80° C. and 25° C. in the temperature change curve of the viscosity. The gelation temperature can be obtained as a temperature at which the viscosity becomes 200 mPa·s in the temperature change curve of the viscosity.

As the rheometer, a stress-control type rheometer Physica MCR series manufactured by Anton Paar can be used. The diameter of a cone plate can be 75 mm, and the cone angle can be 1.0°.

In order to enhance the injection property of the ink from the recording head for ejection, it is preferable that the sol-gel phase transition type ink is such that the temperature of the ink when filled in the recording head for ejection is preset to be (gelation temperature+10°) C. to (gelation temperature+30°) C. of the ink. When the temperature of the ink in the recording head for ejection is lower than (gelation temperature+10° C., the ink is gelled in the recording head for ejection or on the surface of the nozzle, and thus the injection property of the ink easily decreases. On the other hand, when the temperature of the ink in the recording head for ejection is more than (gelation temperature+30°) C., the temperature of the ink becomes too high, and thus the ink components are sometimes deteriorated.

[Inkjet Recording Method]

The inkjet recording method of the present invention includes the steps of:

1) injecting an ink contained in an ink set including the above-mentioned active light beam-curable inkjet magenta ink from an inkjet recording head onto a recording medium, and 2) irradiating the ink that has landed on a recording medium with active light beam.

1) In the step for injection, the ink contained in the ink set including the inkjet magenta ink housed in the recording head for ejection may be ejected as droplets through a nozzle toward the recording medium. At this time, the temperature of the inkjet magenta ink housed in the recording head for ejection is set to a temperature at which the content of the wax contained in the ink is equal to or less than the saturated solution amount or less of the wax in the ink. That is, in the inkjet magenta ink housed in the recording head for ejection, the wax has been dissolved in advance as possible.

The ink set includes at least the active light beam-curable inkjet magenta ink of the present invention. In the case when an image is formed by a single color of magenta, the ink set may be formed of only the active light beam-curable inkjet magenta ink of the present invention, or in the case when an image is to be formed by combining a plurality of colors, for example, ink(s) of either or all of known cyan ink, yellow ink and black ink and the active light beam-curable inkjet magenta ink of the present invention may be used in combination. When an image is formed by using an ink set including the active light beam-curable inkjet magenta ink of the present invention, the color region of magenta can be extended, and magenta dots in the obtained image are difficult to be coalescent with other dots. Furthermore, in the case when the ink set including the active light beam-curable inkjet magenta ink of the present invention contains a plurality of colors, the gloss difference of magenta from other colors is small, and thus the appearance of the obtained image can be improved.

2) In the irradiation step, the ink that has landed on the recording medium is irradiated with active light beam. The ink can be cured by irradiating with active light beam. The light to be emitted may be suitably selected depending on the kind of the photopolymerizable compound, and may be ultraviolet ray, electron beam or the like.

The inkjet recording method of the present invention can be conducted by using an inkjet recording apparatus of an active light beam-curable inkjet system. The inkjet recording apparatus of an active light beam-curable inkjet system include an inkjet recording apparatus of a line recording system (a single pass recording system) and an inkjet recording apparatus of a serial recording system. The inkjet recording apparatus may be selected depending on the required dissolution and recording velocity of an image, and a line recording system (a single pass recording system) is preferable from a viewpoint of high-speed recording.

Figure 1A:
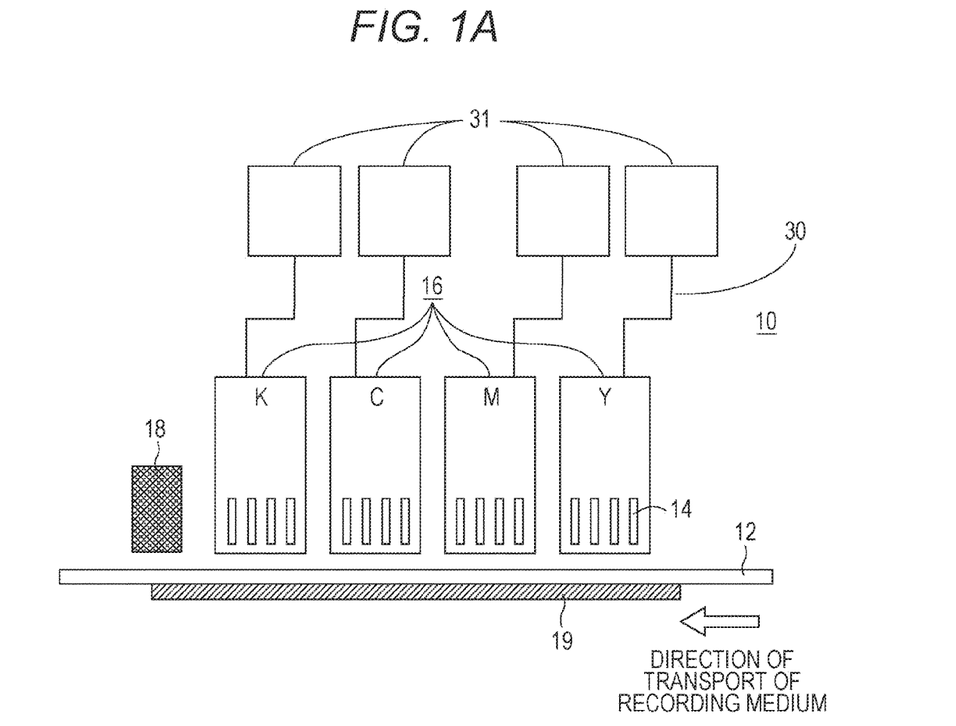
FIG. 1A is a side view showing an example of the constitution of the major part of an inkjet recording apparatus of a line recording system.
Figure 1B:
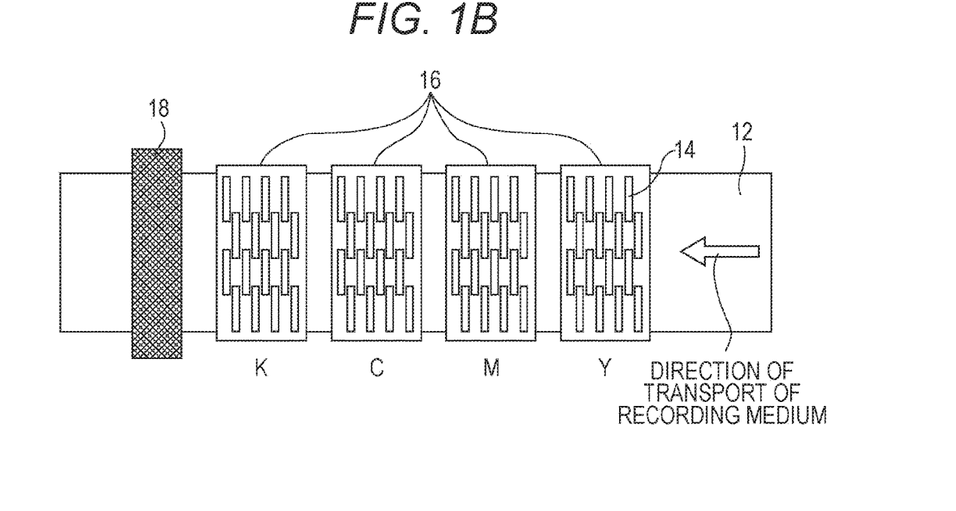
FIG. 1B is an upper surface view of FIG. 1A.

FIG. 1A is a side view showing an example of the constitution of the major part of an inkjet recording apparatus of a line recording system, and FIG. 1B is a top view thereof. As shown in FIGS. 1A and 1B, the inkjet recording apparatus 10 has a head carriage 16 in which a plurality of ink recording heads for ejection 14 are housed, an active light beam irradiating unit 18 that covers the whole width of the recording medium 12 and is disposed on the downstream side of the head carriage 16 (the transport direction of the recording medium), and a temperature controlling unit 19 disposed on the bottom surface of the recording medium 12.

The head carriage 16 is disposed by being fixed so as to cover the whole width of the recording medium 12, and houses the ink recording heads for ejection 14 that are disposed for respective colors. Each ink recording head for ejection 14 is configured so that an ink of either color is supplied from an ink set. For example, the ink set may be prepared in an ink cartridge 31 that is detachably attached to the inkjet recording apparatus 10 so that inks are supplied directly or by an ink supply means 30.

A plural number of the ink recording heads for ejection 14 are disposed for the respective colors in the transport direction of the recording medium 12. The number of the ink recording heads for ejection 14 disposed in the transport direction of the recording medium 12 is preset depending on the nozzle density of the ink recording head for ejection 14 and the resolution of a printed image. For example, in the case when an image having a resolution of 1440 dpi is to be formed by using the ink recording heads for ejection 14 with a droplet amount of 2 pl and a nozzle density of 360 dpi, four ink recording heads for ejection 14 may be disposed in a staggered manner with respect to the transport direction of the recording medium 12. Furthermore, in the case when an image having a resolution of 720×720 dpi is formed by using the ink recording heads for ejection 14 with a droplet amount of 6 pl and a nozzle density of 360 dpi, two ink recording heads for ejection 14 may be disposed in a staggered manner. The dpi represents the number of ink droplets (dots) per 2.54 cm.

The active light beam irradiating unit 18 covers the whole width of the recording medium 12, and is disposed on the downstream side of the head carriage 16 with respect to the transport direction of the recording medium. The active light beam irradiating unit 18 irradiates the droplets that have been ejected by the ink recording heads for ejection 14 and have landed on the recording medium with active light beam to thereby cure the droplets.

In the case when the active light beam is ultraviolet ray, examples of the active light beam irradiating unit 18 (ultraviolet ray irradiation means) include fluorescence tubes (a low pressure mercury lamp, a sterilizing lamp), a cold cathode tube, ultraviolet laser, a low pressure, middle pressure and high pressure mercury lamps each having a working pressure of from several hundreds Pa to 1 MPa, a metal halide lamp and an LED and the like. In view of curability, an ultraviolet irradiation means that emits ultraviolet ray with an illuminance of 100 mW/cm$^2$ or more; specifically, a high pressure mercury lamp, a metal halide lamp and an LED and the like are preferable, and an LED is more preferable in view of a small consumed electrical power. Specifically, a water cooled LED of 395 nm manufactured by Phoseon Technology can be used.

In the case when the active light beam is electron beam, example of the active light beam irradiating unit 18 (an electron beam irradiation means) include electron beam irradiation means such as a scanning system, a curtain beam system and a broad beam system are included, and an electron beam irradiation means of a curtain beam system is preferable in view of processability. Examples of the electron beam irradiation means include "Curetron EBC-200-20-30" manufactured by Nisshin High Voltage Corporation, "Min-EB" manufactured by AIT, and the like.

The temperature controlling unit 19 is disposed on the lower surface of the recording medium 12, and maintains the recording medium 12 at a predetermined temperature. The temperature controlling unit 19 is, for example, various heaters and the like. The pinning property can be enhanced by setting the temperature of the recording medium to from 42° C. to 50° C., preferably from 45° C. to 48° C.

An image recording method using an inkjet recording apparatus 10 of a line recording system will be explained below. A recording medium 12 is transported to between a head carriage 16 and a temperature controlling unit 19 of the inkjet recording apparatus 10. On the other hand, the recording medium 12 is adjusted to a predetermined temperature by the temperature controlling unit 19. Subsequently, an ink of a high temperature is ejected from the ink recording head for ejection 14 of the head carriage 16 and is allowed to adhere (land) onto the recording medium 12. Furthermore, the ink droplets that have adhered onto the recording medium 12 are cured by irradiating with active light beam by the active light beam irradiating unit 18.

The temperature of the ink in the ink recording head for ejection 14 in ejecting the ink from the ink recording head for ejection 14 is preferably preset to a temperature that is 10 to 30° C. higher than the gelation temperature of the ink so as to enhance the injection property of the ink. When the ink temperature in the ink recording head for ejection 14 is lower than (gelation temperature+10°) C., the ink is gelled in the ink recording head for ejection 14 or the surface of the nozzle, and thus the injection property of the ink tends to be lowered. On the other hand, when the temperature of the ink in the ink recording head for ejection 14 goes beyond (gelation temperature+30) ° C., the temperature of the ink becomes too high, and the ink components may be deteriorated.

In order to form an image having a high resolution, the amount of the droplet per one drop ejected from each nozzle of the ink recording heads for ejection 14 is preferably from 1 pl to 10 pl, more preferably from 0.5 to 4.0 pl depending on the resolution of the image.

In the case when an image having a neutral color is to be formed by superposing inks, a first ink containing a color material of a certain color may be imparted, and then a first ink containing another color material having a hue that is different from that of the above-mentioned imparted first ink may be imparted by superposing.

In order to suppress the coalescence of the adjacent ink droplets, it is preferable that the active light beam is emitted within 10 seconds, preferably within from 0.001 seconds to 5 seconds, more preferably within from 0.01 seconds to 2 seconds, after the ink droplets have adhered onto the recording medium. It is preferable that the active light beam is emitted, after the inks have been ejected from all of the ink recording heads for ejection 14 housed in the head carriage 16.

In the case when the active light beam is electron beam, in order to conduct sufficient curing, the acceleration voltage of the electron beam irradiation is preferably from 30 to 250 kV, more preferably from 30 to 100 kV. In the case when the acceleration voltage is from 100 to 250 kV, the irradiation amount of the electron beam is preferably from 30 to 100 kGy, more preferably from 30 to 60 kGy.

The total ink film thickness after the curing is preferably from 2 to 25 μm. The "total ink film thickness" refers to the maximum value of the thickness of the ink film that has been drawn on the recording medium.

Figure 2:
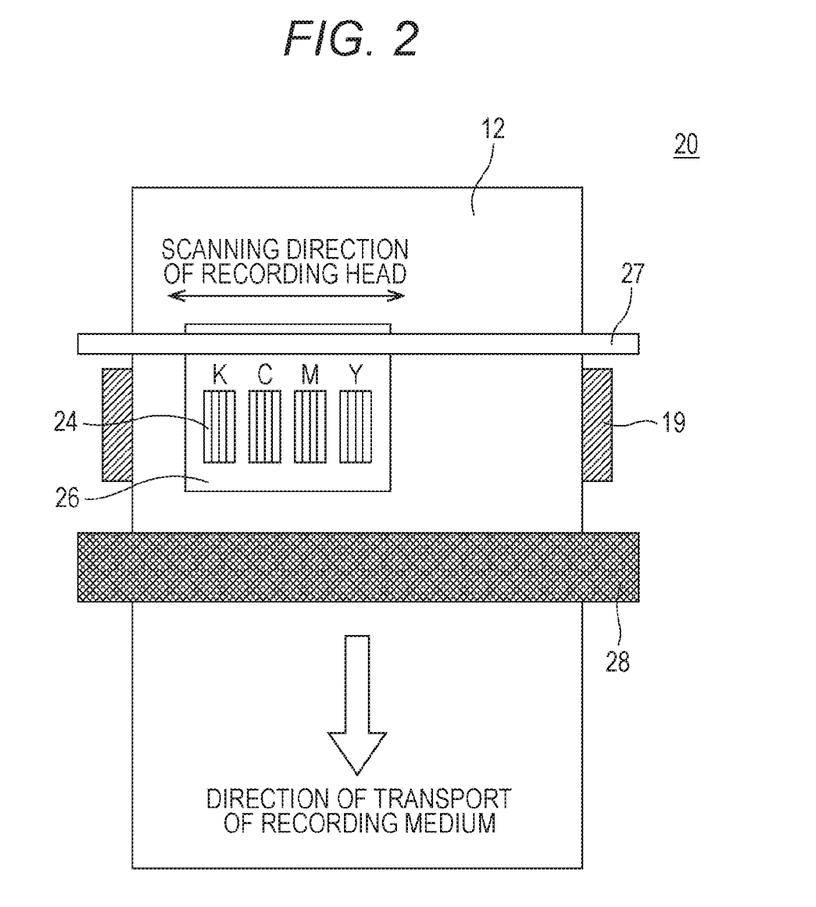
FIG. 2 is a drawing showing an example of the constitution of the major part of an inkjet recording apparatus of a serial recording system.

FIG. 2 is a drawing showing an example of the constitution of the major part of an inkjet recording apparatus 20 of a serial recording system. As shown in FIG. 2, the inkjet recording apparatus 20 can be constituted in a similar manner to that of FIGS. 1A and 1B, except that it has a head carriage 26 that has a width narrower than the whole width of the recording medium and houses a plurality of ink recording heads for ejection 24, instead of the head carriage 16 that is fixed and disposed so as to cover the whole width of the recording medium, and a guide unit 27 for moving the head carriage 26 in the width direction of the recording medium 12.

In the inkjet recording apparatus 20 of a serial recording system, inks are ejected from the ink recording heads for ejection 24 housed in the head carriage 26, while the head carriage 26 transfers in the width direction of the recording medium 12 along the guide unit 27. After the head carriage 26 has transferred in the width direction of the recording medium 12 (in every pass), the recording medium 12 is sent in the transport direction and irradiated with active light beam by an active light beam irradiating unit 28. An image is recorded in an approximately similar manner to that for the inkjet recording apparatus 10 of a line recording system mentioned above, except for these operations.

Examples

The present invention will be explained below in more detail with referring to Examples, but the scope of the present invention is not construed to be limited by these descriptions.

[Surface Treatment of Magenta Pigment]

1.0 kg of a magenta pigment (PV19/PR202, untreated CINQUASIA Magenta D4500J manufactured by BASF) was put into water, stirred and dispersed, and the pH was then adjusted to 10 by adding an aqueous NaOH solution. 100 g of an aqueous solution of sodium aluminate (manufactured by Wako Pure Chemical Industries, Ltd.) (corresponds to 0.5 part in terms of $Al(OH)_2$ with respect to 100 parts of the pigment) was added, the mixture was stirred and mixed, and an aqueous acetic acid solution was then added while the suspension liquid was stirred to thereby adjust the pH to 6. Thereafter, the suspension liquid was immediately separated by filtration, washed with water, and dried to give a surface-treated magenta pigment. By this treatment, 5,000 ppm of alumina was able to be imparted to the magenta pigment powder. By similar methods, the kind of the magenta pigment and the amount of the sodium aluminate were changed according to Table 1, whereby magenta pigments to which alumina had been imparted at different amounts were prepared. The prepared pigment powders were each measured by ICP-AES to thereby obtain the amount of the Al element, and whether or not the alumina had been imparted at a predetermined amount was confirmed. In addition, when a magenta pigment that had not been subjected to surface treatments (untreated) was measured, only the Al element that was originally possessed by the pigment was quantified.

The alumina-imparted magenta pigment prepared above was dispersed in a solvent (2-pyrrolidone) by using a disper, the mixed liquid of the dispersed solvent and the pigment paste was transferred to a container capable of vacuum deaeration, heated to 100 to 120° C. while the pressure was reduced by an aspirator to 50 Torr or less to thereby distill off the moisture contained in the system as possible, and controlled to 55° C. A sulfonating agent (sulfur trioxide) (manufactured by Nippon Soda Co., Ltd., sulfuric anhydride) was then added so as to be 0.15 parts with respect to 100 parts of the magenta pigment and reacted under stirring for 2 to 3 hours, and after the reaction was completed, the surface-treated magenta pigment was washed several times with an excess amount of a solvent, poured into water and filtered to give a surface treatment magenta pigment 1. By this treatment, 1,500 ppm of sulfonic acid was able to be imparted to the magenta pigment powder. By similar methods, magenta pigments 2 to 9 and 11 to which sulfonic acid had been imparted were prepared. The prepared pigment powders were each measured by ICP-AES to thereby obtain the amount of the S element, and whether or not the sulfonic acid had been imparted at a predetermined amount was confirmed. In addition, when a magenta pigment that had not been subjected to surface treatments (untreated) was measured, only generally 20 to 30 ppm of the S element that was originally possessed by the pigment was quantified.

The magenta pigments 10 and 12 were not subjected to the surface treatments with alumina and sulfonic acid.

TABLE 1

| Magenta pigment | Brand of pigment | Kind of pigment | PV19:PR202 ratio | Alumina content (ppm) | Sulfonic acid content (ppm) | Presence or absence of surface treatment |
|---|---|---|---|---|---|---|
| 1 | D4500J (manufactured by BASF) | PV19/PR202 | 65:35 | 1500 | 1500 | Treated |
| 2 | RT-355D (manufactured by BASF) | PV19/PR202 | 65:35 | 2500 | 1500 | Treated |
| 3 | D4500J (manufactured by BASF) | PV19/PR202 | 65:35 | 3000 | 1500 | Treated |
| 4 | 228-2120 (manufactured by Sun Chemical) | PV19/PR202 | 70:30 | 5000 | 1500 | Treated |
| 5 | 228-2120 (manufactured by Sun Chemical) | PV19/PR202 | 70:30 | 7500 | 1500 | Treated |
| 6 | D4500J (manufactured by BASF) | PV19/PR202 | 65:35 | 1000 | 1500 | Treated |
| 7 | 228-2120 (manufactured by Sun Chemical) | PV19/PR202 | 70:30 | 9000 | 1500 | Treated |
| 8 | BRZ (manufactured by DIC) | PV19 | 100:0 | 5000 | 1500 | Treated |
| 9 | BRZ (manufactured by DIC) | PV19 | 100:0 | 2500 | 1500 | Treated |
| 10 | E5B-02 (manufactured by Clariant) | PV19 | 100:0 | 12 | 26 | Not treated |
| 11 | RT-343D (manufactured by BASF) | PR202 | 0:100 | 2200 | 1500 | Treated |
| 12 | RT-243D (manufactured by BASF) | PR202 | 0:100 | 3 | 24 | Not treated |

[Preparation of Magenta Pigment Dispersant]

The magenta pigment dispersant 1 was prepared by the following components.

Magenta pigment 1: 9.0 g
Photopolymerization compound: tripropylene glycol diacrylate (manufactured by Toagosei Co., Ltd.) 32.7 g
Polymer dispersing agent: BYK Jet-9151 (manufactured by BIC Chemie Japan) 3.2 g
Polymerization inhibitor: Irgastab UV-10 (manufactured by BASF) 0.1 g The above-mentioned components in predetermined amounts were put into a 200 cc polyethylene bottle container, 120 g of zirconia beads having a diameter 0.5 mm were further put therein, the container was closed with a lid, and the components were dispersed by an oscillation mill (Red Devil 4500 L manufactured by Nishimura Seisakusho) for 4 hours. After the dispersion, the beads were separated, and the dispersant was taken out.

Magenta pigment dispersants 2 to 12 were prepared in similar procedures, except that magenta pigment 1 was changed to magenta pigments 2 to 12.

[Preparation of Active Light Beam-Curable Ink]

Thereafter the following photopolymerization compounds and additives were added while the dispersant was heated to 60° C., whereby active light beam-curable ink 1-1 was prepared. Magenta pigment dispersant 1: 20.0 g
Photopolymerization compound: polyethylene glycol diacrylate (PEGDA) (manufactured by Daicel Corporation) 6.2 g Photopolymerization compound: 3PO-modified trimethylolpropane triacrylate (manufactured by Toagosei) 6.2 g
Surfactant: TSF-4452 (manufactured by Shin-Etsu Silicone) 0.3 g
Photopolymerization initiator: Irgacure 819 (manufactured by BASF) 0.3 g
Photopolymerization initiator: DAROCURE TPO (manufactured by BASF) 0.3 g
Crystalline gelling agent: Kao Wax T-1 (manufactured by Kao Corporation) 0.8 g Active light beam-curable inks 1-2 to 12-7 were prepared by similar procedures, with changing the kind of the magenta pigment dispersant and the content of Kao Wax T-1 as a crystalline gelling agent according to Tables 2 to 4.

[Printing by Inkjet]

The respective active light beam-curable inks were filtered by a WAC filter (accuracy: 0.3 μm) manufactured by Paul. Thereafter the respective inks were introduced into Konica Minolta inkjet heads (HA512), and a solid image was printed under conditions of a print width of 100 mm×100 mm and a resolution of 720×720 dpi. As the printing substrate, an OK Top Coat (printing paper) was used. As a UV irradiation light source, an LED lamp manufactured by Kyocera Corporation was used, and the printed inks were cured by irradiating the inks with ultraviolet ray at an energy of 250 mJ.

[Evaluation Methods]

(1) Storage Stability (Amount of Increase in Average Diameter)

Each active light beam-curable ink was collected in a heat-resistant tube, and stored at 85° C. for 1 month in a high temperature bath.

The average particle diameter before storage and the average particle diameter after storage were respectively measured by dynamic light scattering by means of a Zetasizer Nano ZSP manufactured by Malvern. At that time, the ink was diluted to 200 times with polyethylene glycol diacrylate (PEGDA). In the case when the difference in the measured values before and after storage was 15 nm or less, the stability of the particles was judged to be fine (represented by + in Tables 2 to 4), and in the case when the difference in the measured values was 7 nm or less, the stability of the particles was judged to be finer (represented by ++ in Tables 2 to 4).

(2) Color Region Difference and Gloss Difference

The print concentration of a Magenta solid image by a Japan color 2011 standard sample (100%) was measured. A square root of the sum of the square of the respective differences of the values of a* and b* of the standard sample and the values of a* and b* of the color region where the print solid concentration of each active light beam-curable ink was measured was calculated and deemed as a color region difference from the standard sample. In the case when the color region difference from the standard sample was 1.5 or less, the color region difference was judged to be small (represented by + in Tables 2 to 4), and when the color region difference was 1.0 or less, the color region difference was judged to be smaller (represented by ++ in Tables 2 to 4).

The value of the 60° C. reflection gloss of the solid image by each active light beam-curable ink was measured by a digital handy gloss meter (Gloss Checker IG-331 manufactured by Horiba, Ltd.). From an average gloss value (40) of solid images of Yellow, Cyan and Black, the degrees of decrease of the reflection gloss value of the magenta solid image by the respective active light beam-curable inks were investigated, and in the case when the absolute value of the difference in the reflection gloss values was 5.0 or less, the gloss difference was judged to be small (represented by + in Tables 2 to 4), and in the case when the absolute value of the difference in the reflection gloss values was 3.0 or less, the gloss difference was judged to be smaller (represented by ++ in Tables 2 to 4).

(3) Pinning Property

A solid 100% image was formed and cured with setting the temperature of a substrate in printing to 50° C., the printed image was observed under a microscope (×200), and the diameters of droplets at 10 positions that were randomly selected were measured. In the case when the average value of the measured values was 50 μm or less, the pinning property was judged to be fine (represented by + in Tables 2 to 4), and in the case when the average value was 45 μm or less, the pinning property was judged to be finer (represented by ++ in Tables 2 to 4).

The results are shown in Tables 2 to 4.

TABLE 2

| Note | Ink No. | Magenta pigment dispersant | Addition amount of gelling agent (wt %) | Amount of increase in average diameter (nm) | | Color region difference | | Gloss difference | | Pinning property (μm) | |
|---|---|---|---|---|---|---|---|---|---|---|---|
| Examples | 1-2 | 1 | 1.5 | 8.0 | + | 1.3 | + | 4.8 | + | 49.0 | + |
| | 1-3 | | 2.0 | 10.0 | + | 1.3 | + | 3.8 | + | 44.5 | ++ |
| | 1-4 | | 2.5 | 11.0 | + | 1.3 | + | 1.9 | ++ | 44.0 | ++ |
| | 1-5 | | 3.0 | 14.0 | + | 1.3 | + | 1.1 | ++ | 41.0 | ++ |
| | 2-2 | 2 | 1.5 | 1.0 | ++ | 1.3 | + | 2.0 | ++ | 48.0 | + |
| | 2-3 | | 2.0 | 4.0 | ++ | 1.3 | + | 0.6 | ++ | 46.8 | + |
| | 2-4 | | 2.5 | 6.0 | ++ | 1.3 | + | −0.3 | ++ | 45.6 | + |
| | 2-5 | | 3.0 | 8.0 | + | 1.3 | + | −1.9 | ++ | 44.3 | ++ |
| | 3-2 | 3 | 1.5 | 0.0 | ++ | 1.3 | + | 3.0 | ++ | 50.0 | + |
| | 3-3 | | 2.0 | 5.0 | ++ | 1.3 | + | 2.0 | ++ | 49.0 | + |
| | 3-4 | | 2.5 | 9.0 | + | 1.3 | + | 0.9 | ++ | 48.0 | + |
| | 3-5 | | 3.0 | 12.0 | + | 1.3 | + | −0.7 | ++ | 45.2 | + |

TABLE 2-continued

| Note | Ink No. | Magenta pigment dispersant | Addition amount of gelling agent (wt %) | Amount of increase in average diameter (nm) | | Color region difference | | Gloss difference | | Pinning property (μm) | |
|---|---|---|---|---|---|---|---|---|---|---|---|
| | 4-2 | 4 | 1.5 | 0.0 | ++ | 0.7 | ++ | -2.5 | ++ | 49.5 | + |
| | 4-3 | | 2.0 | 3.0 | ++ | 0.7 | ++ | -3.0 | ++ | 47.0 | + |
| | 4-4 | | 2.5 | 4.5 | ++ | 0.7 | ++ | -4.1 | + | 45.8 | + |
| | 4-5 | | 3.0 | 5.1 | ++ | 0.7 | ++ | -4.5 | + | 44.2 | ++ |
| | 5-2 | 5 | 1.5 | 0.0 | ++ | 0.7 | ++ | -2.3 | ++ | 49.2 | + |
| | 5-3 | | 2.0 | 1.0 | ++ | 0.7 | ++ | -3.2 | + | 46.7 | + |
| | 5-4 | | 2.5 | 1.5 | ++ | 0.7 | ++ | -4.0 | + | 45.2 | + |
| | 5-5 | | 3.0 | 1.4 | ++ | 0.7 | ++ | -4.5 | + | 44.0 | ++ |

TABLE 3

| Note | Ink No. | Magenta pigment dispersant | Addition amount of gelling agent (wt %) | Amount of increase in average diameter (nm) | | Color region difference | | Gloss difference | | Pinning property (μm) | |
|---|---|---|---|---|---|---|---|---|---|---|---|
| Comparative Examples | 1-1 | 1 | 1.0 | 3.0 | ++ | 1.3 | + | 7.0 | − | 63.0 | − |
| | 1-6 | | 3.5 | 65.0 | − | 1.3 | + | -1.5 | ++ | 40.0 | ++ |
| | 1-7 | | 4.0 | 162.0 | − | 1.3 | + | -1.6 | ++ | 38.0 | ++ |
| | 2-1 | 2 | 1.0 | 0.0 | ++ | 1.3 | + | 3.5 | + | 61.5 | − |
| | 2-6 | | 3.5 | 16.0 | − | 1.3 | + | -2.2 | ++ | 43.5 | ++ |
| | 2-7 | | 4.0 | 27.0 | − | 1.3 | + | -3.6 | + | 43.0 | ++ |
| | 3-1 | 3 | 1.0 | -1.0 | ++ | 1.3 | + | 6.0 | − | 59.0 | − |
| | 3-6 | | 3.5 | 13.0 | + | 1.3 | + | -5.2 | − | 42.3 | ++ |
| | 3-7 | | 4.0 | 15.0 | + | 1.3 | + | -7.3 | − | 40.8 | ++ |
| | 4-1 | 4 | 1.0 | 0.0 | ++ | 0.7 | ++ | -0.7 | ++ | 57.5 | − |
| | 4-6 | | 3.5 | 10.0 | + | 0.7 | ++ | -7.4 | − | 39.0 | ++ |
| | 4-7 | | 4.0 | 12.0 | + | 0.7 | ++ | -9.6 | − | 41.0 | ++ |
| | 5-1 | 5 | 1.0 | 0.0 | ++ | 0.7 | ++ | -1.0 | ++ | 52.0 | − |
| | 5-6 | | 3.5 | 2.2 | ++ | 0.7 | ++ | -6.2 | − | 43.5 | ++ |
| | 5-7 | | 4.0 | 2.6 | ++ | 0.7 | ++ | -8.6 | − | 43.2 | ++ |
| | 6-1 | 6 | 1.0 | 18.0 | − | 1.3 | + | 8.0 | − | 70.0 | − |
| | 6-2 | | 1.5 | 21.0 | − | 1.3 | + | 4.0 | + | 51.0 | − |
| | 6-3 | | 2.0 | 71.0 | − | 1.3 | + | 4.0 | + | 49.0 | + |
| | 6-4 | | 2.5 | 85.0 | − | 1.3 | + | 2.0 | ++ | 47.0 | + |
| | 6-5 | | 3.0 | 73.0 | − | 1.3 | + | 0.5 | ++ | 45.0 | ++ |
| | 6-6 | | 3.5 | 94.0 | − | 1.3 | + | -0.9 | ++ | 42.0 | ++ |
| | 6-7 | | 4.0 | 117.0 | − | 1.3 | + | -1.4 | ++ | 40.0 | ++ |
| | 7-1 | 7 | 1.0 | 0.0 | ++ | 0.7 | ++ | -3.0 | ++ | 54.2 | − |
| | 7-2 | | 1.5 | 0.0 | ++ | 0.7 | ++ | -4.5 | + | 53.1 | − |
| | 7-3 | | 2.0 | 1.0 | ++ | 0.7 | ++ | -6.2 | − | 49.3 | + |
| | 7-4 | | 2.5 | 1.0 | ++ | 0.7 | ++ | -7.8 | − | 48.5 | + |
| | 7-5 | | 3.0 | 2.0 | ++ | 0.7 | ++ | -9.5 | − | 47.2 | + |
| | 7-6 | | 3.5 | 4.0 | ++ | 0.7 | ++ | -11.2 | − | 46.5 | + |
| | 7-7 | | 4.0 | 8.0 | + | 0.7 | ++ | -11.6 | − | 46.7 | + |

TABLE 4

| Note | Ink No. | Magenta pigment dispersant | Addition amount of gelling agent (wt %) | Amount of increase in average diameter (nm) | | Color region difference | | Gloss difference | | Pinning property (μm) | |
|---|---|---|---|---|---|---|---|---|---|---|---|
| Comparative Examples | 8-1 | 8 | 1.0 | 0.0 | ++ | 2.8 | − | -0.2 | ++ | 67.0 | − |
| | 8-2 | | 1.5 | 0.0 | ++ | 2.8 | − | -1.2 | ++ | 57.0 | − |
| | 8-3 | | 2.0 | 0.0 | ++ | 2.8 | − | -1.5 | ++ | 52.0 | − |
| | 8-4 | | 2.5 | 11.0 | + | 2.8 | − | -2.3 | ++ | 50.0 | + |
| | 8-5 | | 3.0 | 14.0 | + | 2.8 | − | -2.7 | ++ | 49.0 | + |
| | 8-6 | | 3.5 | 65.0 | − | 2.8 | − | -5.0 | + | 47.0 | + |
| | 8-7 | | 4.0 | 162.0 | − | 2.8 | − | -21.5 | − | 46.0 | + |
| | 9-1 | 9 | 1.0 | 0.0 | ++ | 2.8 | − | -1.3 | ++ | 67.0 | − |
| | 9-2 | | 1.5 | 9.0 | + | 2.8 | − | -2.2 | ++ | 57.0 | − |
| | 9-3 | | 2.0 | 13.0 | + | 2.8 | − | -2.5 | ++ | 52.0 | − |
| | 9-4 | | 2.5 | 31.0 | − | 2.8 | − | -3.6 | + | 50.0 | + |
| | 9-5 | | 3.0 | 45.0 | − | 2.8 | − | -4.8 | + | 49.0 | + |
| | 9-6 | | 3.5 | 65.0 | − | 2.8 | − | -5.2 | − | 47.0 | + |
| | 9-7 | | 4.0 | 152.0 | − | 2.8 | − | -21.5 | − | 46.0 | + |

TABLE 4-continued

| Note | Ink No. | Magenta pigment dispersant | Addition amount of gelling agent (wt %) | Amount of increase in average diameter (nm) | | Color region difference | | Gloss difference | | Pinning property (μm) | |
|---|---|---|---|---|---|---|---|---|---|---|---|
| | 10-1 | 10 | 1.0 | 98.0 | − | 2.8 | − | 1.0 | ++ | 64.0 | − |
| | 10-2 | | 1.5 | 129.0 | − | 2.8 | − | 0.0 | ++ | 54.0 | − |
| | 10-3 | | 2.0 | 116.0 | − | 2.8 | − | −0.5 | ++ | 48.0 | + |
| | 10-4 | | 2.5 | 138.0 | − | 2.8 | − | −1.0 | ++ | 47.5 | + |
| | 10-5 | | 3.0 | 162.0 | − | 2.8 | − | −2.0 | ++ | 45.0 | ++ |
| | 10-6 | | 3.5 | 187.0 | − | 2.8 | − | −11.0 | − | 44.0 | ++ |
| | 10-7 | | 4.0 | 210.0 | − | 2.8 | − | −15.0 | − | 42.8 | ++ |
| | 11-1 | 11 | 1.0 | −1.0 | ++ | 5.6 | − | −3.1 | + | 70.0 | − |
| | 11-2 | | 1.5 | 0.0 | ++ | 5.6 | − | −4.1 | + | 64.5 | − |
| | 11-3 | | 2.0 | 0.0 | ++ | 5.6 | − | −5.1 | − | 45.2 | + |
| | 11-4 | | 2.5 | 0.3 | ++ | 5.6 | − | −6.3 | − | 42.9 | ++ |
| | 11-5 | | 3.0 | 3.0 | ++ | 5.6 | − | −7.1 | − | 42.1 | ++ |
| | 11-6 | | 3.5 | 2.0 | ++ | 5.6 | − | −9.2 | − | 41.1 | ++ |
| | 11-7 | | 4.0 | 6.0 | ++ | 5.6 | − | −11.2 | − | 40.5 | ++ |
| | 12-1 | 12 | 1.0 | 29.0 | − | 5.6 | − | 4.0 | + | 71.0 | − |
| | 12-2 | | 1.5 | 29.0 | − | 5.6 | − | 1.6 | ++ | 68.0 | − |
| | 12-3 | | 2.0 | 37.0 | − | 5.6 | − | 0.9 | ++ | 44.5 | ++ |
| | 12-4 | | 2.5 | 43.0 | − | 5.6 | − | −0.3 | ++ | 44.0 | ++ |
| | 12-5 | | 3.0 | 49.0 | − | 5.6 | − | −0.8 | ++ | 41.0 | ++ |
| | 12-6 | | 3.5 | 74.0 | − | 5.6 | − | −1.2 | ++ | 40.0 | ++ |
| | 12-7 | | 4.0 | 83.0 | − | 5.6 | − | −4.5 | + | 38.0 | ++ |

In the case when the alumina content of the pigment and the content of the gelling agent in the ink were within the scopes of the present invention, all of the storage stability, color region difference, gloss difference and pinning property had fine values.

When the content of the gelling agent was less than 1.5 wt %, the pinning property was deteriorated, whereas when the content of the gelling agent was more than 3.0 wt %, the gloss difference tended to be high. The reason therefor is considered that, when the gelling agent was small, the ink was gelled insufficiently and thus the ink diameter became large, whereas when the gelling agent was much, too much gloss was generated by the gelling agent precipitated on the surface of the image.

When the solid-solution of PV19/PR202 was used, the color region difference was improved more, and thus a color closer to the standard sample was able to be represented, as compared to the cases when a pigment of only PV19 was used, or a pigment of only PR202 was used. Furthermore, when a magenta pigment that had not been subjected to surface treatments was used, the average particle diameter increased during the storage, and thus the storage stability was not fine. The reason therefor is considered that, since the alumina or sulfonic acid or the like on the surface of the pigment was small, the affinity with the non-aqueous vehicle such as the photopolymerizable compound and the polymer dispersing agent decreased, and thus the pigment was put into association.

Even in the case when a solid-solution of PV19/PR202 was used, in the case when the content of the alumina was lower than 1,500 ppm, the average particle diameter increased during the storage, and thus the storage stability was not fine. The reason therefor is considered that, since the alumina on the surface of the pigment was small, the affinity with the non-aqueous vehicle such as the photopolymerizable compound and the polymer dispersing agent decreased, and thus the pigment was put into association.

Furthermore, even in the case when a solid-solution of PV19/PR202 was used, in the case when the content of the alumina was larger than 7,500 ppm, the gloss difference and the pinning property were not able to be attained simultaneously. The reason therefor is considered that, since the alumina on the surface of the pigment was much, the alumina and the gelling agent were put into association. That is, it is considered that, when the amount of the gelling agent was small, the ink was gelled insufficiently due to the association of the alumina and the gelling agent, and thus the ink diameter was increased, whereas when the amount of the gelling agent was increased, the crystal growth of the gelling agent was inhibited due to the association of the alumina and the gelling agent, and thus too much gloss was generated due to excess leveling.

INDUSTRIAL APPLICABILITY

An image formed from the active light beam-curable inkjet magenta ink of the present invention has fine storage stability and pinning property, and also has a small gloss difference from other colors. Therefore, the present invention is preferable for the preparation of various printed products that require glossiness.

The present application is an application claiming priority based on Japanese Patent Application No. 2014-036614, and the contents of the application are herein incorporated by reference.

REFERENCE SIGNS LIST

10, 20: inkjet recording apparatus
12: recording medium
14, 24: ink recording head for ejection
16, 26: head carriage
18, 28: active light beam irradiating unit
19: temperature controlling unit
27: guide unit

The invention claimed is:
1. An active light beam-curable inkjet magenta ink,
  wherein the ink comprises a pigment, a polymer dispersing agent, a crystalline gelling agent, a photopolymerizable compound and a photopolymerization initiator,
  the pigment is a solid-solution of PV19 and PR202 which has been subjected to surface treatments with alumina and sulfonic acid, the impart amount of the alumina with respect to the pigment is from 1,500 to 7,500 ppm by mass ratio, and the content of the crystalline gelling agent is from 1.5 to 3.0% by mass with respect to the entirety of the ink.

2. The ink according to claim 1, wherein the pigment contains the PV19 in a larger amount than that of the PR202 by mass ratio.

3. The ink according to claim 1, wherein the impart amount of the alumina with respect to the pigment is from 5,000 to 7,500 ppm by mass ratio.

4. The ink according to claim 1, wherein the impart amount of the alumina with respect to the pigment is from 2,500 to 3,000 ppm by mass ratio.

5. An inkjet recording method, comprising:
injecting an ink contained in an ink set comprising the light beam-curable inkjet magenta ink according to claim 1 from an inkjet recording head onto a recording medium; and
irradiating the ink that has landed on the recording medium with active light beam.

6. The ink according to claim 2, wherein the impart amount of the alumina with respect to the pigment is from 5,000 to 7,500 ppm by mass ratio.

7. The ink according to claim 2, wherein the impart amount of the alumina with respect to the pigment is from 2,500 to 3,000 ppm by mass ratio.

8. An inkjet recording method, comprising:
injecting an ink contained in an ink set comprising the light beam-curable inkjet magenta ink according to claim 2 from an inkjet recording head onto a recording medium; and
irradiating the ink that has landed on the recording medium with active light beam.

9. An inkjet recording method, comprising:
injecting an ink contained in an ink set comprising the light beam-curable inkjet magenta ink according to claim 3 from an inkjet recording head onto a recording medium; and
irradiating the ink that has landed on the recording medium with active light beam.

10. An inkjet recording method, comprising:
injecting an ink contained in an ink set comprising the light beam-curable inkjet magenta ink according to claim 4 from an inkjet recording head onto a recording medium; and
irradiating the ink that has landed on the recording medium with active light beam.

* * * * *